United States Patent
Matsui et al.

(10) Patent No.: US 10,922,864 B2
(45) Date of Patent: *Feb. 16, 2021

(54) IMAGE PROCESSING DEVICE, IMAGE PROCESSING METHOD AND PROGRAM, FOR OBJECT DETECTION IN AN IMAGE

(71) Applicant: CANON KABUSHIKI KAISHA, Tokyo (JP)

(72) Inventors: Taichi Matsui, Yokohama (JP); Toshio Saishoji, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,304

(22) Filed: Oct. 15, 2019

(65) Prior Publication Data

US 2020/0043215 A1 Feb. 6, 2020

Related U.S. Application Data

(63) Continuation of application No. 15/588,355, filed on May 5, 2017, now Pat. No. 10,475,221.

(30) Foreign Application Priority Data

May 19, 2016 (JP) .............................. JP2016-100654
May 19, 2016 (JP) .............................. JP2016-100669

(51) Int. Cl.
*G06T 11/60* (2006.01)
*G06K 9/00* (2006.01)
*G06K 9/20* (2006.01)

(52) U.S. Cl.
CPC .......... *G06T 11/60* (2013.01); *G06K 9/00362* (2013.01); *G06K 9/00771* (2013.01); *G06K 9/2081* (2013.01); *G06T 2200/24* (2013.01)

(58) Field of Classification Search
None
See application file for complete search history.

(56) References Cited

U.S. PATENT DOCUMENTS

| 2012/0007997 A1* | 1/2012 | Oikawa | G03B 13/36 348/208.6 |
| 2012/0033854 A1* | 2/2012 | Jo | G06K 9/00778 382/103 |
| 2014/0016013 A1* | 1/2014 | Huang | H04N 5/23293 348/333.11 |

(Continued)

FOREIGN PATENT DOCUMENTS

| JP | H09-281605 A | 10/1997 |
| JP | 2007-280325 A | 10/2007 |

(Continued)

*Primary Examiner* — Jeffrey J Chow
(74) *Attorney, Agent, or Firm* — Canon U.S.A., Inc. I.P. Division

(57) ABSTRACT

An image processing device includes: a display control unit configured to cause a display unit to display an image, and to cause the display unit to display a mark corresponding to a detection object detected in the image; and an output unit configured to output a number of the marks displayed on the display unit, wherein the display control unit adds or deletes a mark according to a user operation, and the output unit outputs the number of marks after the addition or after the deletion.

26 Claims, 12 Drawing Sheets

(56) References Cited

U.S. PATENT DOCUMENTS

| | | | |
|---|---|---|---|
| 2014/0192217 A1* | 7/2014 | Kim | H04N 5/23293 348/222.1 |
| 2015/0227782 A1* | 8/2015 | Salvador | G06F 16/583 382/118 |
| 2016/0307597 A1* | 10/2016 | Koide | G11B 27/031 |
| 2018/0012078 A1* | 1/2018 | Pournaghi | G06K 9/00718 |
| 2018/0018508 A1* | 1/2018 | Tusch | G06K 9/00771 |
| 2018/0101723 A1* | 4/2018 | Wakako | G06T 7/70 |
| 2018/0188892 A1* | 7/2018 | Levac | G09F 27/005 |

FOREIGN PATENT DOCUMENTS

| | | |
|---|---|---|
| JP | 2013-093639 A | 5/2013 |
| JP | 2013-182550 A | 9/2013 |
| WO | 2016/147653 A1 | 9/2016 |

* cited by examiner

IMAGE PROCESSING DEVICE, IMAGE PROCESSING METHOD AND PROGRAM, FOR OBJECT DETECTION IN AN IMAGE

CROSS REFERENCE TO RELATED APPLICATIONS

The present application is a continuation of U.S. patent application Ser. No. 15/588,355, filed on May 5, 2017, which claims priority from Japanese Patent Application No. 2016-100669 filed May 19, 2016, and Japanese Patent Application No. 2016-100654 filed May 19, 2016. These documents are hereby incorporated by reference herein in their entirety.

BACKGROUND

Field

The present disclosure relates to an image processing device, an image processing method and a program.

Description of the Related Art

Conventionally, an object detection device that detects a human body or the like in an image is well known. The object detection device is used for, for example, measuring the number of audience members in a stadium, and measuring the number of visitors who visit an amusement park. Japanese Patent Laid-Open No. 2014-6586 discloses a technology for measuring the number of specific objects in an image irrespective of a degree of congestion.

However, when object detection is performed, a false detection or un-detection may occur.

SUMMARY

In order to easily correct or adjust the number of detected detection objects, various embodiments have, for example, the following configuration. An image processing device including: a display control unit configured to cause a display unit to display an image, and to cause the display unit to display a mark corresponding to a detection object detected in the image; and an output unit configured to output a number of the marks displayed on the display unit, wherein the display control unit adds or deletes a mark according to a user operation, and the output unit outputs the number of the marks after the addition or after the deletion.

In addition, in order to easily correct or adjust the number of detected detection objects, various embodiments have, for example, the following configuration. An image processing device including: a detecting unit configured to detect a detection object from an image on the basis of each of a first condition and a second condition; and a display control unit configured to cause a display unit to display the image, and to cause the display unit to display a mark corresponding to a detection object detected by the detecting unit in the image, wherein the display control unit identifiably displays a mark corresponding to a detection object that has been detected on the basis of the first condition, and a mark corresponding to a detection object that has not been detected on the basis of the first condition, and that has been detected on the basis of the second condition.

Further features will become apparent from the following description of exemplary embodiments (with reference to the attached drawings).

DESCRIPTION OF THE EMBODIMENTS

First Embodiment

A first embodiment will be described below with reference to the accompanying drawings.

Figure 1:
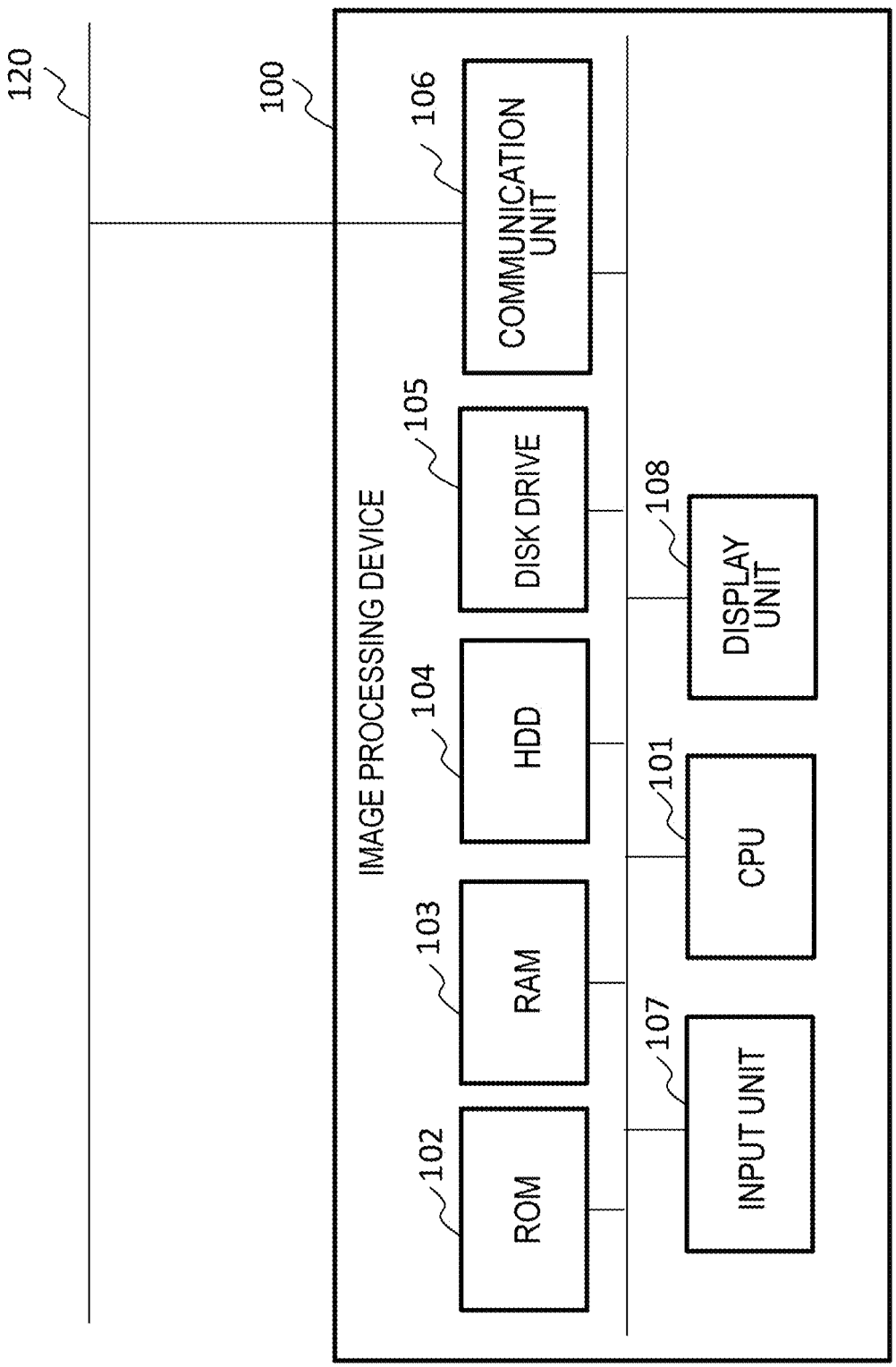
FIG. 1 is a diagram illustrating an example of a hardware configuration of an image processing device according to a first embodiment.

FIG. 1 is a diagram illustrating an example of a hardware configuration of an image processing device 100 according to the present embodiment. The image processing device 100 includes a CPU 101, a ROM 102, a RAM 103, a hard disk drive (HDD) 204, a disk drive 105, a communication unit 106, an input unit 107, and a display unit 108.

The CPU 101 is a control unit that performs the overall control of the image processing device 100. The ROM 102 stores a program that is used to control the image processing device 100 by the CPU 101. It should be noted that a secondary storage unit may be provided as an alternative to the ROM 102. The RAM 103 is a memory that is used to expand therein a program read from the ROM 102 by the CPU 101 and to execute processing. In addition, the RAM 103 is also used as a storage area that is used to temporarily store data targeted for various kinds of processing as a temporary storage memory. The HDD 104 stores various kinds of information such as image files targeted for image processing of the image processing device 100. An image file is input into the CPU 101 from the HDD 104. It should be noted that the image file may be input not from the HDD 104 but from the disk drive 105 or the communication unit 106 by the CPU 101. In this case, the CPU 101 does not need to include the HDD 104. The undermentioned functions and processing of the image processing device 100 are realized by reading a program stored in the ROM 102 or the HDD 104, and then by executing the program, by the CPU 101.

The disk drive 105 reads an image file stored in a CD, a DVD, a Blu-ray Disc or a flexible disk, and the CPU 101 inputs the image file through the disk drive 105. It should be noted that if the CPU 101 inputs the image file from the HDD 104 or the communication unit 106, the disk drive 105 is not always required.

The communication unit 106 is a circuit that performs communication through a network 120. The CPU 101 inputs an image file through the network 120. If the CPU 101 inputs the image file from the HDD 104 or the disk drive 105, the communication unit 106 is not always required. The display unit 108 is a device such as a display for displaying an image and an area frame. The input unit 107 includes a keyboard for inputting numerical values, and a pointing device, a mouse, and a touch panel which are used to instruct a display position of a display area of the display unit 108.

Figure 2:
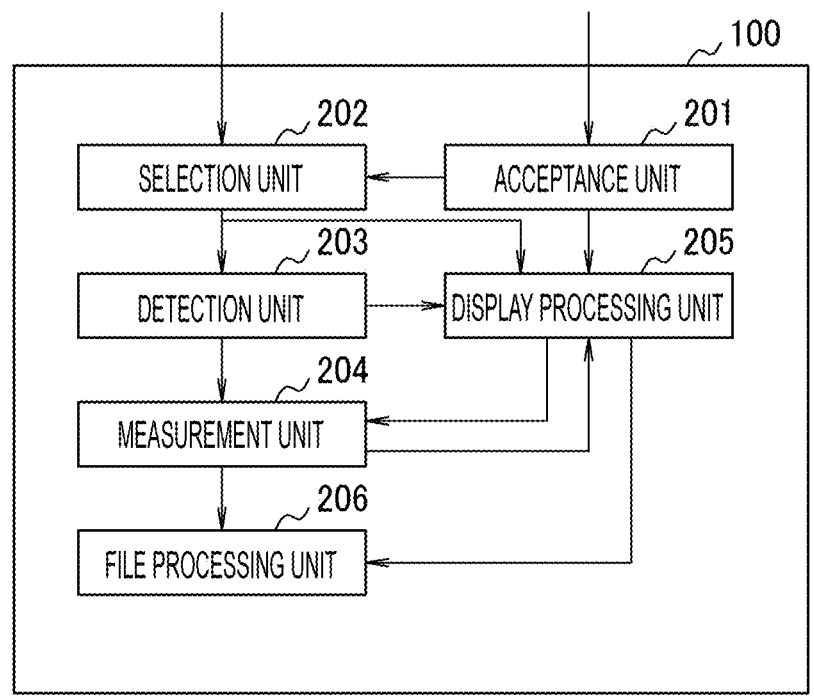
FIG. 2 is a diagram illustrating a software configuration of the image processing device according to the first embodiment.

FIG. 2 is a diagram illustrating a software configuration of the image processing device 100. The image processing device 100 includes an acceptance unit 201, a selection unit 202, a detection unit 203, a measurement unit 204, a display processing unit 205, and a file processing unit 206. The acceptance unit 201 accepts various kinds of instructions inputted by a user through the input unit 107. According to a selection instruction from the user, which has been accepted by the acceptance unit 201, the selection unit 202 selects an image to be processed from among a plurality of images stored in a storage unit such as the HDD 104. Hereinafter, the image to be processed is referred to as a "target image". It should be noted that the target image may be a still image or a moving image.

The detection unit 203 performs image analysis of the target image, and detects a predetermined image. The present embodiment will be described by taking, as an example, a case where a person is detected. However, a detection object is not limited to a person, but may be, for example, a predetermined object including a moving object such as a vehicle. Moreover, the detection object is not limited to an object, but may be a character or a symbol, which is drawn on an object, such as numbers drawn on a vehicle. Thus, the detection object may be anything that can be detected from an image, and the kind thereof is not limited to those in the embodiments. Furthermore, the detection unit 203 records the position and size of a detected person in a storage unit such as the RAM 103. It should be noted that a method for detecting a person from an image is not particularly limited. For example, a method in which a person is recognized by recognizing a person's face, a method in which a person is recognized from the size of a person's head, and a method in which a person is recognized from an inclination of a shoulder are mentioned.

The measurement unit 204 measures the number of persons (the number of people) detected by the detection unit 203 from the target image. The display processing unit 205 performs control so as to display various kinds of information on the display unit 108. The display processing unit 205 controls displaying of various kinds of information on the display unit 108. The display processing unit 205 performs control so as to display, for example, a target image on the display unit 108. The display processing unit 205 further performs control so as to display the result of detection by the detection unit 203 on the display unit 108. The file processing unit 206 creates a result file that includes a target image, and information about, for example, the number of persons as the detection result obtained from the target image, and saves the result file. In addition, the file processing unit 206 outputs the result file to an external device or the like as appropriate.

From the detection result displayed on the display unit 108 by the display processing unit 205, the user is capable of checking, for example, an area in which an object other than a person is detected as a person, and an area in which a person is not detected although the person is present. In addition, the user is allowed to input, by simple user operation, an instruction to correct the detection result as appropriate. When the measurement unit 204 accepts the correction instruction from the user, the measurement unit 204 changes (corrects) the number of persons as the measurement result according to the instruction. Incidentally, this processing will be described in detail later with reference to FIGS. 3 and 4, and the like.

Figure 3:
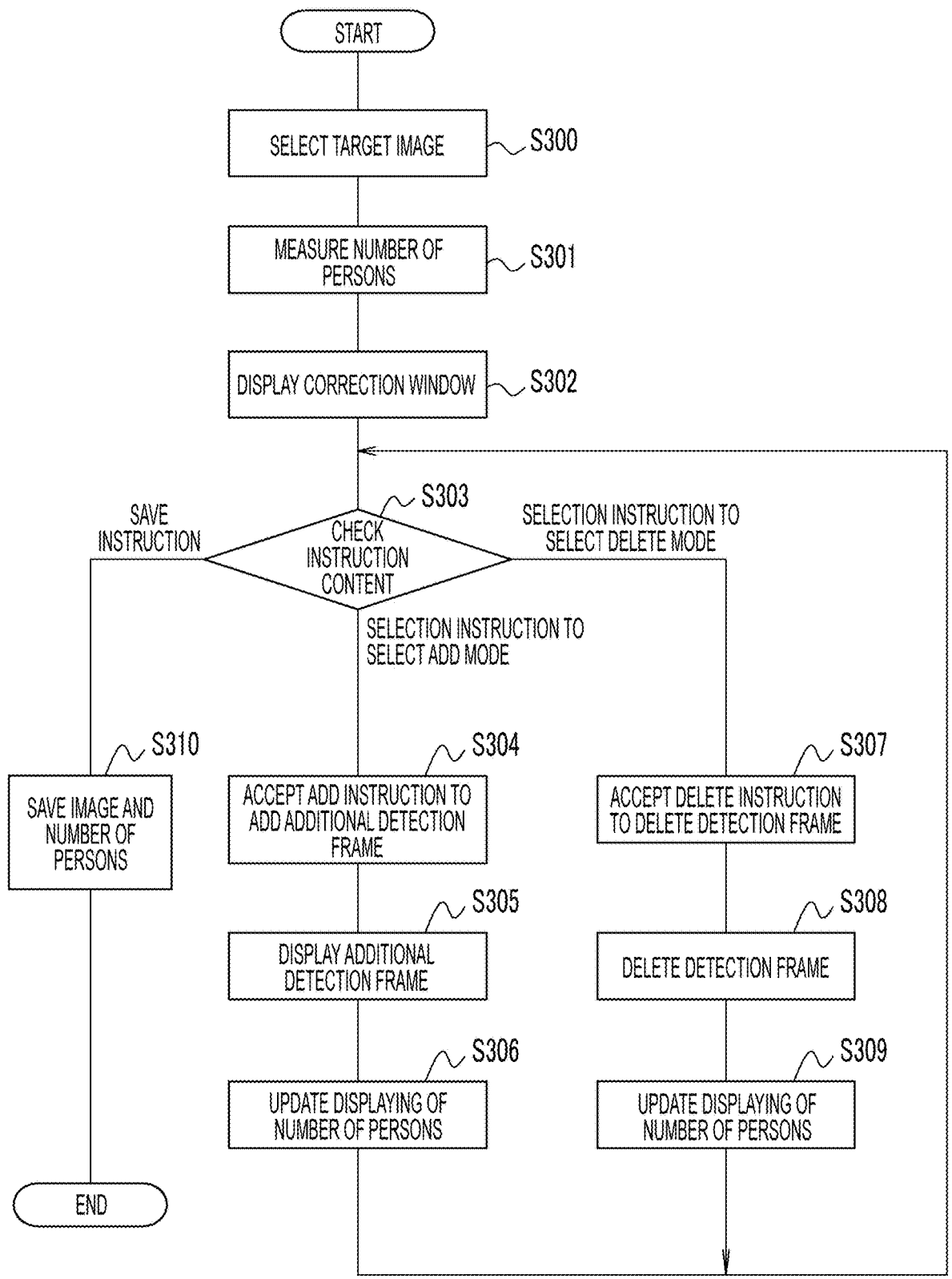
FIG. 3 is a flowchart illustrating detection processing according to the first embodiment.
Figure 4:
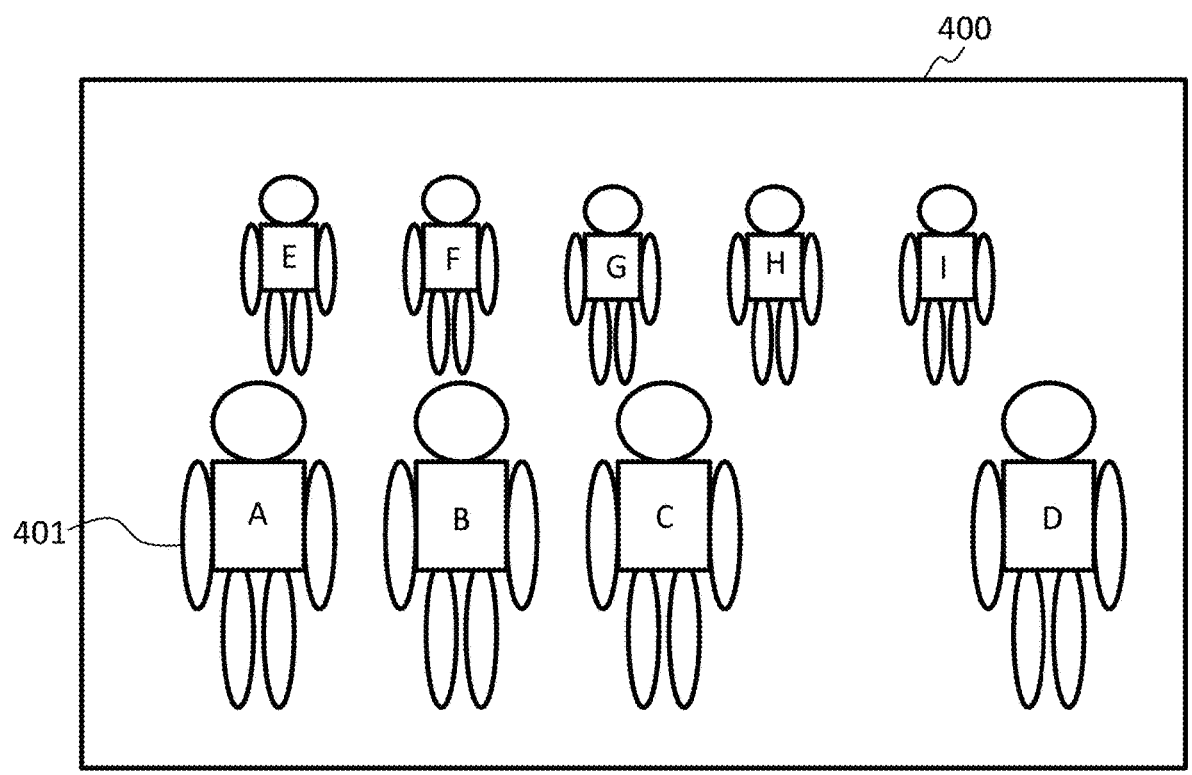
FIG. 4 is a drawing illustrating an example of a target image according to the first embodiment.

FIG. 3 is a flowchart illustrating detection processing by the image processing device 100. Detection processing will be described below by referring to a target image 400 shown in FIG. 4 and a screen transition shown in FIGS. 5A to 5C. In the target image 400 shown in FIG. 4, nine persons 401 come out. Here, for convenience of explanation, persons from the lower left person to the lower right person are referred to as a person A, a person B, a person C and a person D in order. Further, persons from the upper left person to the upper right person are referred to as a person E, a person F, a person G, a person H, and a person I in order. In the present embodiment, the image processing device 100 handles, for example, an image taken by a monitoring camera, which is mounted on a wall or a pillar, as an object to be processed. Therefore, an image to be processed is generated by diagonally imaging a person from above, and therefore the persons on the lower side of the image come out larger in size than the persons on the upper side of the image.

Returning to FIG. 3, in S300, the selection unit 202 selects a target image, which is an object to be processed, according to an image selection instruction accepted by the acceptance unit 201. When the target image is, for example, a still image, the selection unit 202 specifies a still image file. In addition, when the target image is a moving image, the selection unit 202 selects a target scene (frame) in a moving image file. For example, the display unit 108 reproduces and displays a live moving image or a recorded moving image. When a desired scene is displayed, the user performs user operation of specifying this scene. Meanwhile, the acceptance unit 201 accepts a selection instruction in which the frame is specified.

Next, in S301, the detection unit 203 detects persons. The detection unit 203 detects persons by using, as a detection object area, a flat space specified beforehand that is, for example, the whole captured image, a predetermined area with respect to the center of the captured image or the like. Subsequently, the measurement unit 204 measures the number of persons (the number of people) detected by the detection unit 203. It should be noted that the measurement unit 204 may be configured to start measuring the number of persons when the acceptance unit 201 accepts a measurement instruction according to the user operation.

Figure 5A:
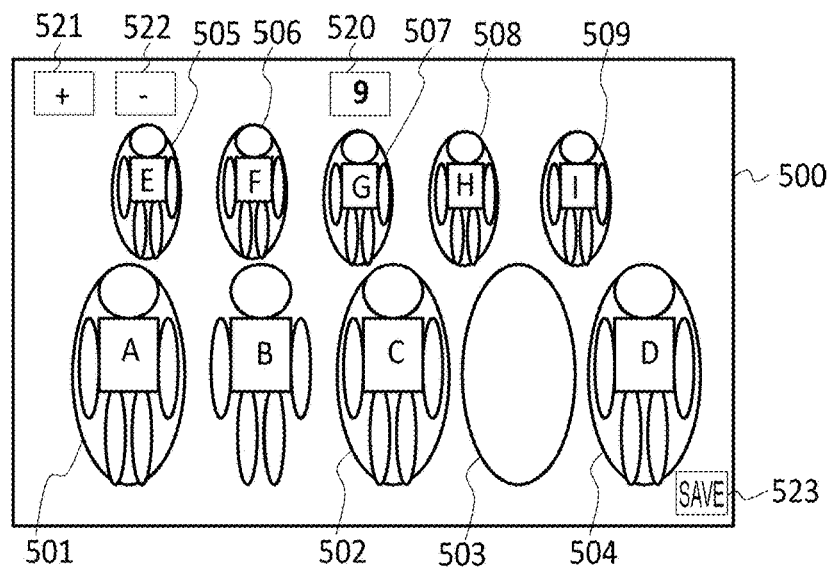
FIGS. 5A to 5C are drawings illustrating a screen transition according to the first embodiment.

Next, in S302, the display processing unit 205 performs control so as to display a correction window. This processing is an example of display control processing. FIG. 5A is a drawing illustrating an example of a correction window 500. A target image is displayed in the correction window 500. Moreover, detection frames 501 to 509 are displayed in the target image so as to be superimposed respectively on areas in which the respective persons have been detected. Here, the detection frames 501 to 509 are an example of marks displayed respectively corresponding to the detection objects. For example, the detection frame 501 is displayed so as to be superimposed on the person A.

It should be noted that the correction window 500 of FIG. 5A shows a detection result obtained in a case where the person B has not been detected as a person, but a person has been detected by mistake between the person C and the person D, in the target image. In other words, a detection frame corresponding to the person B is not displayed, and a detection frame 503 is displayed between the person C and the person D.

Moreover, a number-of-persons label 520 is displayed in the upper part of the correction window 500. The number of persons measured by the measurement unit 204 is displayed in the number-of-persons label 520. In addition, a Save button 523 is displayed in the lower right of the correction window 500. The Save button 523 is a user interface for accepting a save instruction to save the number of persons, which is the measurement result, together with the target image.

An Add Mode button 521 and a Delete Mode button 522 are displayed in the upper left of the correction window 500. Each of the buttons 521, 522 is a user interface for accepting a start instruction to start a mode corresponding thereto. An add mode and a delete mode are operation modes for correcting the number of persons detected by the detection unit 203. In the add mode, a person who has not been detected can be added to the detection result according to the user operation. In the delete mode, a person (an object other than persons) related to the false detection can be deleted from the detection result according to the user operation.

It should be noted that in the present embodiment, although a surrounding line that surrounds a detected person is displayed as a mark indicating a detected person, the shape, size and the like of the mark are not limited to those in the embodiments. Further, in the present embodiment, in the target image, the marks are displayed respectively in the areas in which the respective persons have been detected. However, the marks have only to be displayed in such a manner that a user can visually recognize the correspondence relationships with the areas in which the respective persons have been detected, and thus do not always need to be displayed in the detected areas. As another example, arrows each indicating a person as a target may be displayed. In addition, as still another example, coordinates of the detected area may be displayed in an area that differs from the target.

Returning to FIG. 3, subsequent to the processing of S302, the CPU 101 causes the processing to proceed to S303. In S303, when the acceptance unit 201 accepts an instruction according to user input, the CPU 101 checks the instruction content of the instruction. When the instruction content is a selection instruction to select the add mode (a selection instruction to select the add mode in S303), the CPU 101 causes the processing to proceed to S304. When the instruction content is a selection instruction to select the delete mode (a selection instruction to select the delete mode in S303), the CPU 101 causes the processing to proceed to S307. When the instruction content is a save instruction (a save instruction in S303), the CPU 101 causes the processing to proceed to S310.

Figure 6:
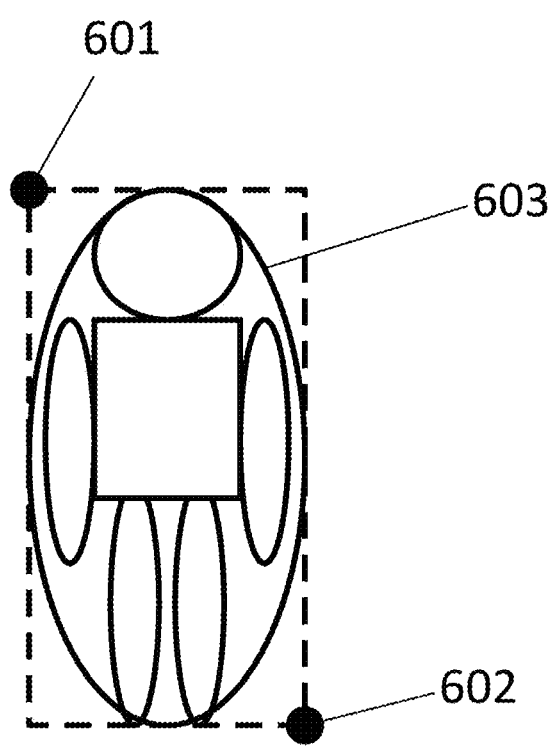
FIG. 6 is an explanatory drawing illustrating user operation according to the first embodiment.

In S304, according to the user operation, the acceptance unit 201 accepts an add instruction to add a new detection frame. The add instruction includes information that specifies the position and size of the detection frame to be added. Hereinafter, the detection frame that is newly added by the user operation is referred to as an "additional detection frame". FIG. 6 is an explanatory drawing illustrating user operation of specifying the position and size of an additional detection frame. By dragging an area to which a user desires to add a detection frame in the correction window 500, the user can specify the position and size of an additional detection frame. It is assumed that the user moves a mouse down at a point 601, and moves the mouse up at a point 602. In this case, the acceptance unit 201 identifies a rectangle having opposite angles that correspond to the point 601 and the point 602 respectively, and then accepts the add instruction that includes the position and size of an ellipse 603 inscribed in the identified rectangle.

Next, in S305, the display processing unit 205 displays, in the correction window 500, the additional detection frame related to the add instruction. Here, the additional detection frame is an example of an additional mark. Next, in S306, the measurement unit 204 increases the number of persons by the number of additional detection frames that have been added to the correction window 500 based on the measurement result. Subsequently, the display processing unit 205 displays the number of detection frames after the addition, that is to say, the number of persons after the correction, in the number-of-persons label 520. After that, the CPU 101 causes the processing to proceed to S303.

Figure 5B:
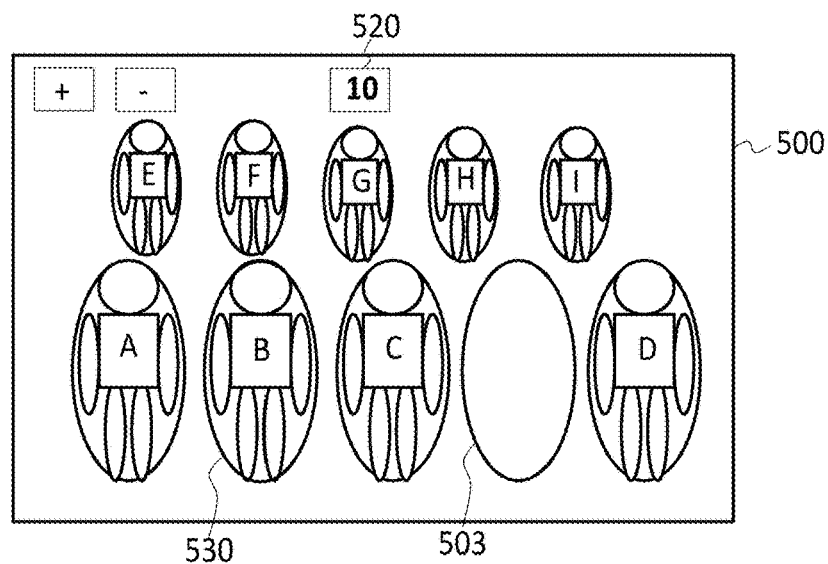

For example, it is assumed that the user presses the Add Mode button 521, and specifies a rectangle surrounding the person B in the correction window 500 shown in FIG. 5A. In this case, as shown in FIG. 5B, an additional detection frame 530 is added so as to surround the person B. Moreover, as shown in FIG. 5B, the number of persons in the number-of-persons label 520 increases from "9" shown in FIG. 5A to "10".

Returning to FIG. 3, in S307, according to the user operation, the acceptance unit 201 accepts a delete instruction to delete a detection frame displayed in the correction window 500. The delete instruction includes information that specifies a detection frame to be deleted, among the detection frames displayed in the correction window 500. For example, the user moves a cursor into the detection frame 503 displayed in the correction window 500 of FIG. 5B, and then clicks thereinto. Meanwhile, the acceptance unit 201 specifies, as an object to be deleted, the detection frame 503 including the clicked point, and accepts a delete instruction to delete the specified detection frame 503. It should be noted that when the clicked point is located in a plurality of detection frames, all of the plurality of detection frames are specified as objects to be deleted.

Figure 5C:
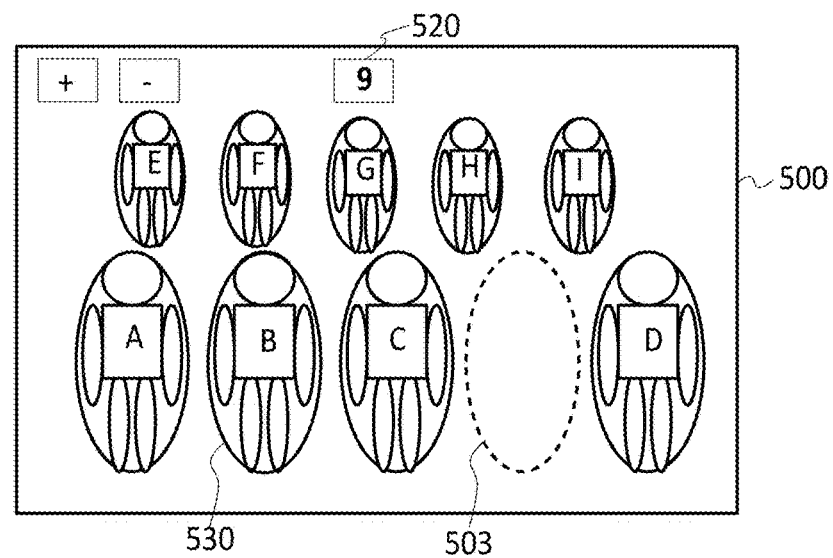

Next, in S308, the display processing unit 205 deletes, from the correction window 500, the detection frame related to the delete instruction. Next, in S309, in response to the measurement result, the measurement unit 204 decreases the number of persons by the number of detection frames that have been deleted from the correction window 500. Subsequently, the display processing unit 205 displays the number of detection frames after the decrease, that is to say, the number of persons after the correction, in the number-of-persons label 520. After that, the CPU 101 causes the processing to proceed to S303. For example, when the detection frame 503 is specified in the correction window 500 of FIG. 5B, the detection frame 503 is deleted as shown in FIG. 5C. Moreover, the number of persons in the number-of-persons label 520 decreases from "10" shown in FIG. 5B to "9".

In addition, in S310, the file processing unit 206 saves, as a result file, a superimposed image in which detection frames are superimposed, which is displayed in the correction window 500, and the number of persons displayed in the number-of-persons label 520 in a storage unit such as the HDD 104. After the above processing, the detection processing ends. It should be noted that the file processing unit 206 is also capable of outputting the result file to the outside. It should be noted that the file processing unit 206 has only to save the result file that includes at least the number of detected persons (when the number of persons has been corrected, the number of persons after the correction). The file processing unit 206 may save, for example, the target image, information indicating positions of the detection frames, and the number of detected persons as the result file.

As described above, according to the user operation, the image processing device 100 according to the present embodiment is capable of performing correction processing, for example, the addition and deletion of a detection frame, on the display screen that displays the detection result of detecting persons, and saving and outputting the number of detected objects on which the result of the correction processing is reflected. In other words, the image processing device 100 is capable of easily correcting the number of detected objects without requiring complicated operation by the user.

Figure 7:
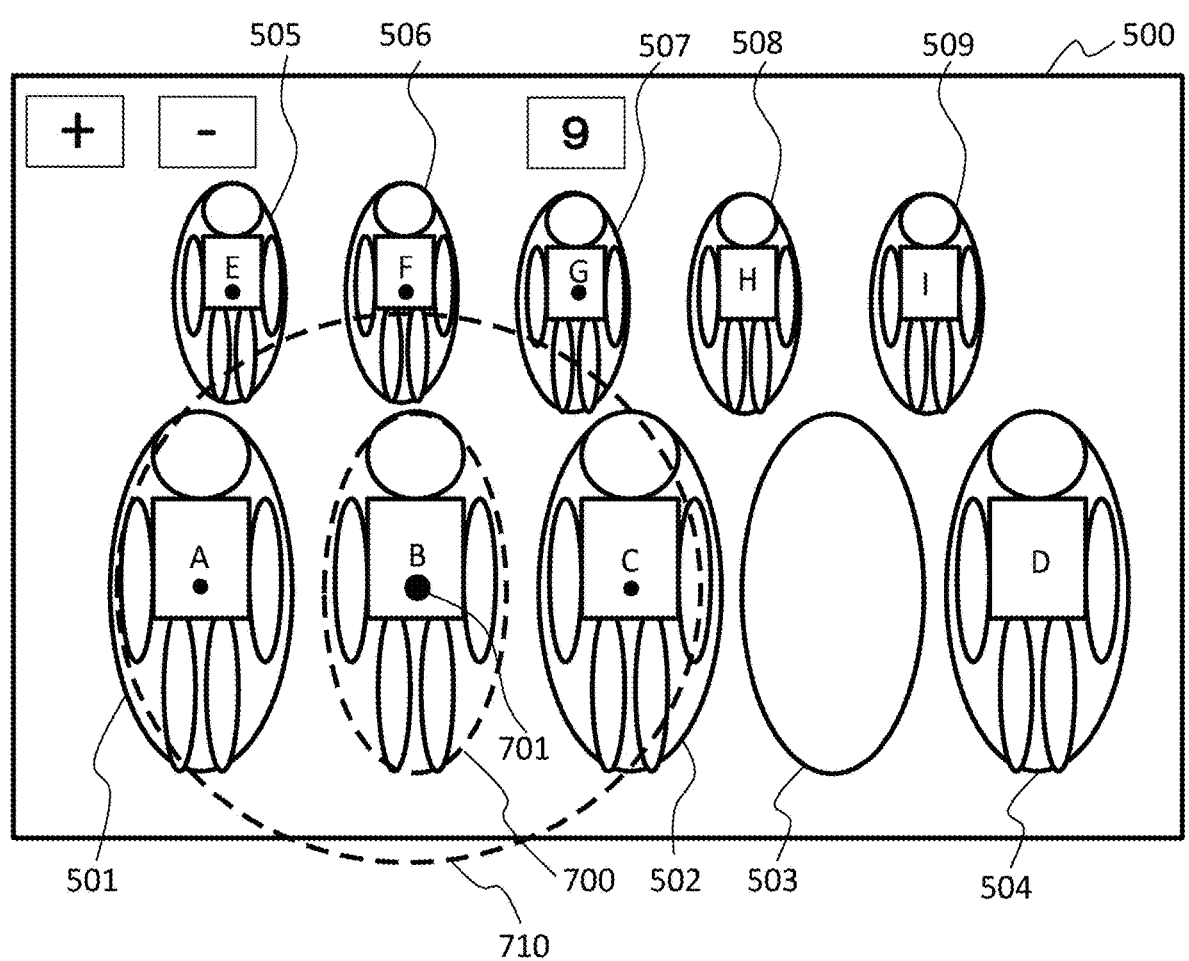
FIG. 7 is an explanatory drawing of an example of changing according to the first embodiment.

A modification example of the image processing device 100 according to the present embodiment will be described. In the add mode, the processing of determining the position and size of the additional detection frame is not limited to that shown in the present embodiment. For example, the user may input an add instruction that specifies only a position instead of specifying the position and the size. A case where the user desires to add a detection frame to the person B will be specifically described as an example with reference to FIG. 7. The user clicks a central point 701 of the person B. It should be noted that a point in proximity to the center suffices as the central point 701. Meanwhile, the display processing unit 205 accepts an add instruction that specifies the central point 701 as a position. Moreover, in this case, the display processing unit 205 automatically determines the size of an additional detection frame. The following processing can be mentioned as the processing for determining the size. Incidentally, this processing is an example of size determination processing.

The first is processing in which a predetermined size is used as the size of the additional detection frame. In other words, the display processing unit 205 displays, as an additional detection frame, a detection frame having the predetermined size at a position related to the add instruction.

The second is processing in which the size that is the same as that of a detection frame located at a position closest to a specified position is used as the size of the additional detection frame. The display processing unit 205 identifies the distance between the position related to the add instruction and a central point of each surrounding additional detection frame. Subsequently, the display processing unit 205 displays an additional detection frame, the size of which is the same as that of the detection frame located at the closest position.

The third is processing in which an average value of sizes of detection frames, the central points of which fall within a predetermined distance range from a specified position respectively, is used as the size of the additional detection frame. The display processing unit 205 identifies detection frames, the central points of which fall within the predetermined distance range from the position related to the add instruction respectively. Subsequently, the display processing unit 205 determines an average value of sizes of the identified detection frames, and then displays an additional detection frame, the size of which is equivalent to the average value. For example, in an example shown in FIG. 7, detection frames, the respective central points of which fall within a reference range 710 that is a predetermined distance range, are detection frames 501, 502 that correspond to the persons A and C respectively. Accordingly, the display processing unit 205 displays an additional detection frame 700, the size of which is equivalent to an average value of the sizes of the detection frames 501, 502.

The fourth is processing in which the size of an additional detection frame is determined according to the tendency of sizes of a plurality of detection frames in the target image. For example, as shown in an example of FIG. 8, when a central point 801 of the person B is specified, first of all, the display processing unit 205 identifies sizes of all detection frames displayed in the correction window 500, and then groups the detection frames according to the sizes. For example, the display processing unit 205 determines the number of groups from the distribution of the sizes of the plurality of detection frames, and identifies detection frames belonging to each group. Subsequently, a line that connects among the central points of the detection frames belonging to each group is identified. This processing is an example of line identification processing. In addition, the display processing unit 205 selects, from among the identified lines, a line, the distance from a specified position of which is shorter than a distance threshold value, and determines an average value of the sizes of the detection frames connected by the selected line to be the size of the additional detection frame. In this manner, the display processing unit 205 selects one line on the basis of the positional relationship between the identified line and the specified position, and determines the size of the additional detection frame on the basis of the sizes of the detection frames connected by the selected line.

Figure 8:
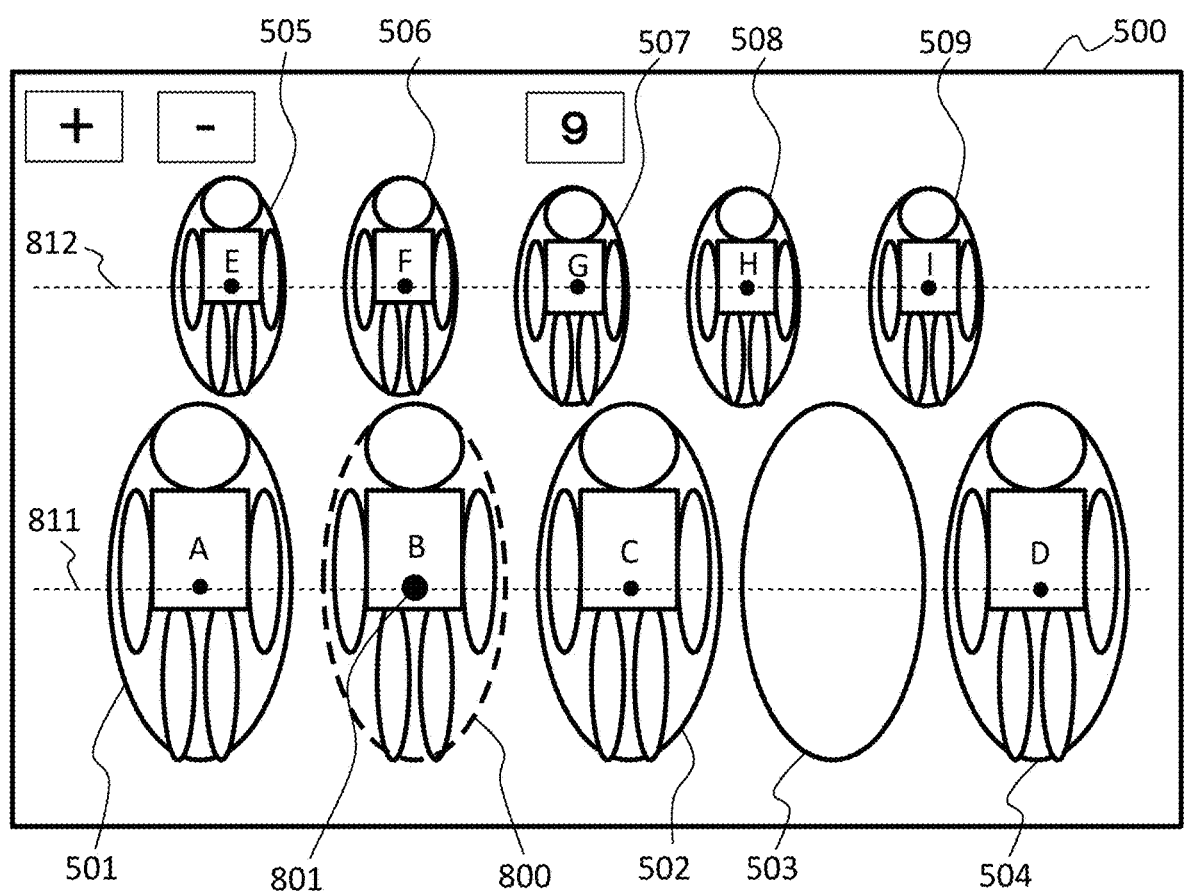
FIG. 8 is an explanatory drawing of an example of changing according to the first embodiment.

In the example shown in FIG. 8, the detection frames 501, 502, 503, 504 are grouped, and a straight line 811 passing through the central points of the respective detection frames 501, 502, 503, 504 is identified. In addition, the detection frames 505, 506, 507, 508, 509 are grouped, and a straight line 812 passing through the respective detection frames 505, 506, 507, 508, 509 is identified. It is assumed that the distance from the straight line 811 to the specified position (the central point 801) is a predetermined value or less. Moreover, it is assumed that an average value of the sizes of the detection frames 505, 506, 507, 508, 509 is "5", whereas an average value of the sizes of the detection frames 501, 502, 503, 504 is "10". In this case, the display processing unit 205 determines the size of the additional detection frame to be "10".

Further, in this case, the display processing unit 205 may determine, as the central point of the additional detection frame, a position that is moved from the position specified by the user to a position on the straight line 811 (a position on the line). In this case, the display processing unit 205 displays an additional detection frame 800 having a size of "10" with the determined position on the straight line 811 used as the central point. Moreover, as another example, there is a case where it is known that when, for example, positional relationships with the other persons are taken into consideration, a central point is not located on the straight line 811. In such a case, the display processing unit 205 may determine, as the central point of the additional detection frame, such a position that the distance between the straight line 811 and the central point is shortened as much as possible. In this case as well, the display processing unit 205 displays the additional detection frame 800 with the determined position used as the central point.

Furthermore, the display processing unit 205 may display the additional detection frame 800 in a moving manner by means of an animation or the like according to the straight line 811. For example, first of all, the display processing unit 205 displays the additional detection frame 800 having a size of "10" at the position specified by the user. Subsequently, the display processing unit 205 moves the additional detection frame 800 from the position specified by the user to a position on the straight line 811, or to such a position that the distance to the straight line 811 is shortened. As described above, according to the abovementioned embodiment, the number of detected detection objects can be easily corrected.

Second Embodiment

A second embodiment will be described below with reference to the accompanying drawings. It should be noted that explanations for components similar to those in the first embodiment will be omitted as appropriate. A hardware configuration and a software configuration are similar to those in the first embodiment.

Figure 9:
FIG. 9 is a drawing illustrating an example of a target image according to a second embodiment.

FIG. 9 is a drawing illustrating an example of a target image 300 according to the present embodiment. A plurality of persons come out in the target image 300. Incidentally, it is assumed that an image to be processed by the image processing device 100 is an image taken by, for example, a monitoring camera that is installed at a predetermined place, and that images a predetermined imaging range. Therefore, it is possible to assume beforehand, for example, the sizes of persons who come out in the target image, a posture of each person, that is to say, a standing position or a sitting position, and possible positional relationships among the plurality of persons. Therefore, parameters used for detecting persons by the detection unit 203 can also be optimized according to, for example, sizes of persons who are assumed to be detected in the target image.

The image processing device 100 according to the present embodiment is based on the assumption that reference conditions, which mean that a person is detected by detecting the size of the upper body of the person, are predetermined as detection conditions. Moreover, the reference conditions are based on the assumption that an optimized parameter value (range) is defined for a parameter of the half-body size of the person. Hereinafter, the optimized parameter value is referred to as a "reference value".

It should be noted that the reference conditions may include only one parameter, or may include a plurality of parameters that differ in kind. In addition, the kinds and reference values of parameters which are included in the reference conditions are not particularly limited.

Figure 10:
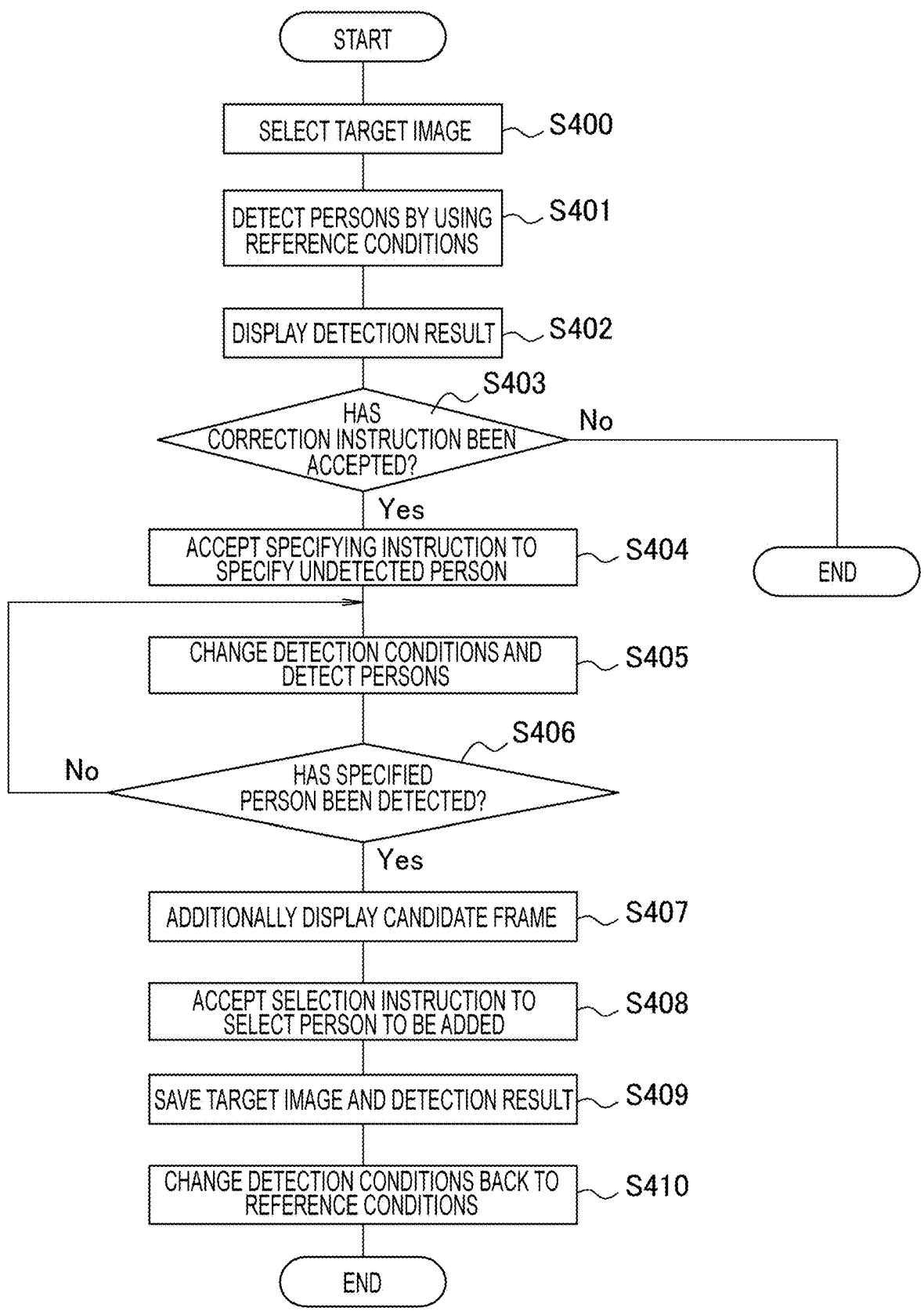
FIG. 10 is a flowchart illustrating detection processing by an image processing device according to the second embodiment.
Figure 11A:
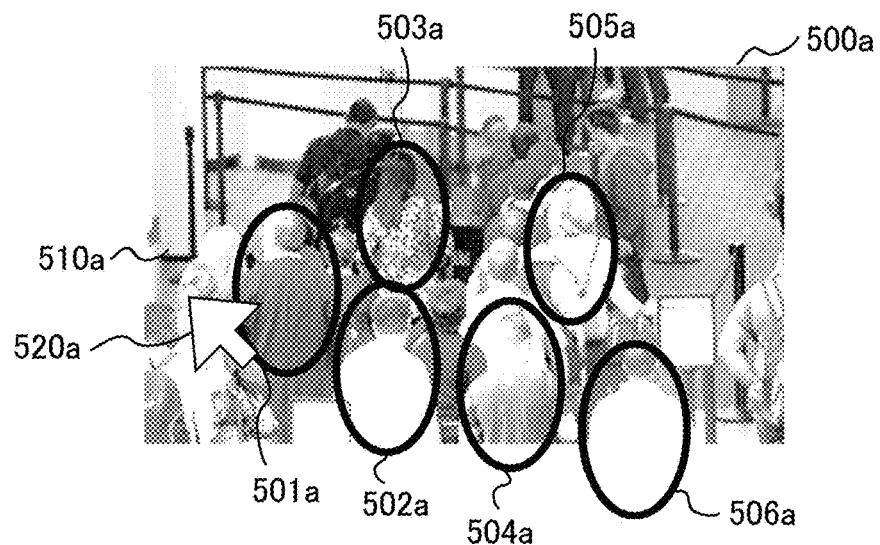
FIGS. 11A to 11C are drawings illustrating a screen transition according to the second embodiment.
Figure 11B:
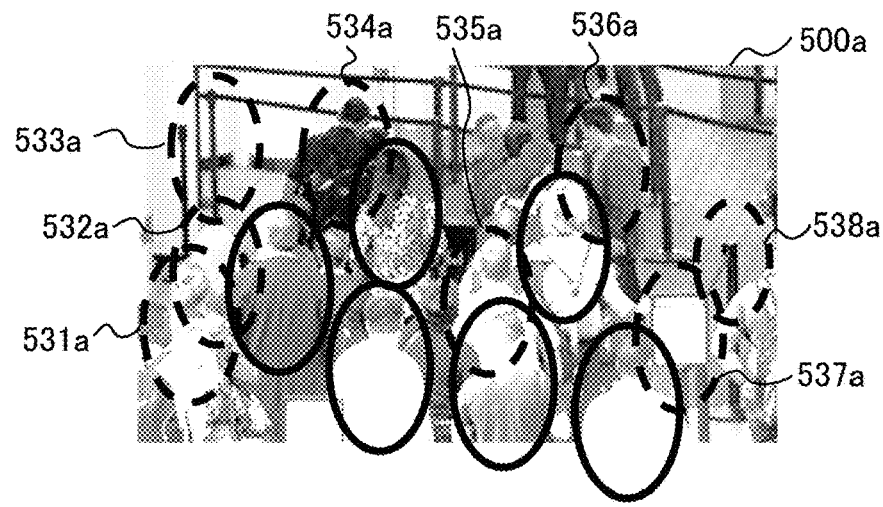
Figure 11C:
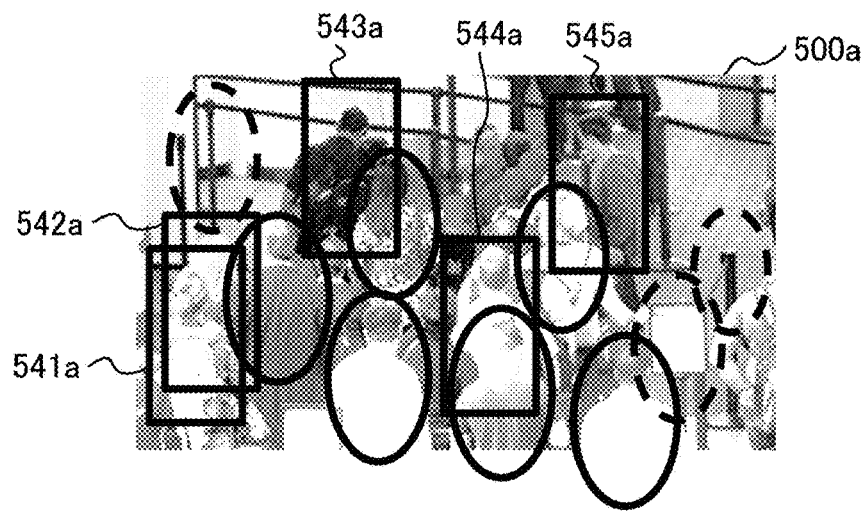

FIG. 10 is a flowchart illustrating detection processing by the image processing device 100 according to the present embodiment. FIGS. 11A to 11C are drawings illustrating an example of a screen transition of a result screen 500a that shows a detection result for the target image 300. Detection processing will be described below with reference to a screen transition shown in FIGS. 11A to 11C. In S400, the selection unit 202 selects a target image, which is an object to be processed, according to an image selection instruction accepted by the acceptance unit 201. When the target image is, for example, a still image, the selection unit 202 specifies a still image file. In addition, when the target image is a moving image, the selection unit 202 selects a target scene (frame) in a moving image file. For example, the display unit 108 reproduces and displays a live moving image or a recorded moving image. When a desired scene is displayed, a user performs user operation of specifying this scene. Meanwhile, the acceptance unit 201 accepts a selection instruction in which the frame is specified.

Next, in S401, the detection unit 203 detects persons by using reference conditions. The detection unit 203 detects persons by using, as a detection object area, a flat space specified beforehand that is, for example, the whole captured image, a predetermined area with respect to the center of the captured image or the like. Subsequently, the measurement unit 204 measures the number of persons (the number of people) detected by the detection unit 203. It should be noted that the measurement unit 204 may be configured to start measuring the number of persons when the acceptance unit 201 accepts a measurement instruction according to the user operation.

Next, in S402, the display processing unit 205 displays the result screen 500a that shows the detection result. As shown in FIG. 11A, the target image 300 is displayed on the result screen 500a, and detection frames 501a to 506a are displayed in the target image with the detection frames 501a to 506a superimposed respectively on areas in which the respective persons have been detected. Here, the detection frames 501a to 506a are an example of marks displayed respectively corresponding to the detection objects. All of the detection frames 501a to 506a are elliptical frames. In addition, the processing of S402 is an example of display control processing that displays marks on the display unit 108.

As the result of viewing the result screen 500a of FIG. 11A, when an area in which a person comes out is not detected as a person, the user is allowed to input a correction instruction through the input unit 107. For example, a person is also present on the left side of the detection frame 501a in the result screen 500a of FIG. 11A. When the user desires to include this person in the detection result, first of all, the user inputs a correction instruction to make a correction.

Returning to FIG. 10, subsequent to the processing of S402, in S403, the acceptance unit 201 checks whether or not the correction instruction has been accepted according to the user operation. The processing of S403 is an example of acceptance processing. When the acceptance unit 201 has accepted a correction instruction (Yes in S403), the acceptance unit 201 causes the process to proceed to S404. When the acceptance unit 201 has not accepted a correction instruction (No in S403), the acceptance unit 201 ends the detection processing. In S404, the acceptance unit 201 accepts a specifying instruction to specify an undetected person according to the user operation. For example, in the result screen 500a of FIG. 11A, when the user puts a cursor of a mouse on an area of a person on the left side of the detection frame 501a to specify the person, the acceptance unit 201 accepts a specifying instruction to specify the person corresponding to a position of the cursor.

Next, in S405, the detection unit 203 changes the detection conditions. Hereinafter, the detection conditions after the change are referred to as "other detection conditions". In other words, the other detection conditions are detection conditions that differ from the reference conditions. The other detection conditions according to the present embodiment differ in parameter value (range) from the reference conditions. In the present embodiment, the detection unit 203 changes a value (reference value) of a parameter related to the upper-body size of a person, which is set in the reference conditions, to such a value that a person having a larger size or a smaller size is detected. In the present embodiment, it is assumed that such a value that an area having a size ranging from "a" to "b" (a<b) is detected as an area of the upper body is set as a reference value. Meanwhile, the detection unit 203 changes the parameter value to such a value that an area having a size ranging from "a−x"

to "b+x" is detected. In other words, the other detection conditions are conditions in which such a parameter value that an area having a size ranging from "a−x" to "b+x" is detected is set. The detection unit 203 further uses the other detection conditions after the change to detect persons again.

It should be noted that in the present embodiment, although the detection unit 203 changes the parameter value so as to widen the size range in both the plus and minus directions, the parameter value may be changed in either the plus or minus direction. In addition, the change amount (x) may be any value so long as the value is predetermined, and a specific value thereof is not particularly limited.

Next, in S406, the detection unit 203 checks whether or not a person related to the specifying instruction has been detected. When the person related to the specifying instruction has been detected (Yes in S406), the detection unit 203 causes the processing to proceed to S407. When the person related to the specifying instruction has not been detected (No in S406), the detection unit 203 causes the processing to proceed to S405. Incidentally, in this case, in S405, the detection unit 203 further changes the parameter value to detect the person. For example, it is assumed that the parameter value at the time of the processing (that is to say, the parameter value after the change in S405 last time) is such a value that an area having a size ranging from "a−x" to "b+x" is detected. In this case, in this processing, the detection unit 203 changes the parameter value to such a value that an area having a size ranging from "a−2x" to "b+2x" is detected. It should be noted that the change amount (x) of the parameter value may differ between the first time change and the second time change.

In S407, in the result screen 500a, the display processing unit 205 additionally displays respective candidate frames on areas in which respective persons have been detected as the result of the person detection based on the other detection conditions. The candidate frames are an example of marks displayed corresponding to the respective persons (detection objects) that have been obtained by the person detection based on the other detection conditions. It should be noted that the persons that have been obtained on the basis of the other detection conditions are not immediately reflected on the detection result, and therefore the number of persons measured by the measurement unit 204 at this point of time, which is the detection result, is the number of persons obtained by the person detection based on the reference conditions.

As with the detection frames, the candidate frames are elliptical frames. The display processing unit 205 identifiably displays the detection frames corresponding to the respective detection objects detected on the basis of the reference conditions, and the candidate frames corresponding to the respective detection objects detected on the basis of the other detection conditions. In the present embodiment, the display processing unit 205 indicates the detection frames corresponding to the reference conditions with elliptical solid lines, and indicates the candidate frames corresponding to the other detection conditions with elliptical dotted lines.

Candidate frames 531a to 538a corresponding to the other detection conditions are additionally displayed on the result screen 500a of FIG. 11B. The candidate frame 532a is also displayed for the person related to the specifying instruction. The candidate frames 531a to 538a are indicated with elliptical dotted lines respectively. It should be noted that a specific method for identifiably displaying the detection frames and the candidate frames is not limited to that in the embodiment. As another example, the line type of the frames may be changed, or the color of the frames may be changed.

As shown in FIG. 11B, the user checks the screen to which the candidate frames have been added, and selects, from among the candidate frames 531a to 538a, a candidate frame of a person who is desired to be actually added. Meanwhile, in S408, the acceptance unit 201 accepts a selection instruction in which a person to be added is specified. Moreover, the display processing unit 205 displays the candidate frames corresponding to the persons related to the selection instruction in a display mode that differs from the display mode of the candidate frames that have not been selected. In the result screen 500a of FIG. 11C, candidate frames 541a to 545a related to the selection instruction are changed to frames indicated with quadrangular solid lines respectively. Furthermore, in this case, the measurement unit 204 updates (corrects) the number of persons by adding the number of persons related to the selection instruction to the number of persons obtained by the person detection based on the reference conditions.

Next, in S409, the file processing unit 206 saves, as a result file, a superimposed image, and the number of persons detected by the person detection (when an update has been made, the number of persons after the update) in a storage unit such as the HDD 104. Here, the superimposed image included in the result file is a superimposed image obtained by superimposing the candidate frames related to the selection instruction and the detection frames, which are displayed on the result screen 500a, on the target image. The file processing unit 206 is also capable of outputting the result file to the outside. It should be noted that the file processing unit 206 has only to save the result file that includes at least the number of detected persons (when an addition has been made, the number of persons after the addition). The file processing unit 206 may save, as the result file, for example, the target image, information about detected positions as the detection result of detecting persons on the basis of the reference conditions, information about detected positions of the persons related to the selection instruction, and the total number of persons as the detection result. Next, in S410, the detection unit 203 changes the detection conditions back to the reference conditions. After the above processing, the detection processing ends.

As described above, the image processing device 100 according to the present embodiment detects persons by using the reference conditions. In addition, when a person who has not been detected is present, according to simple user operation, the image processing device 100 is capable of executing the person detection again on the basis of such detection conditions that the person desired by the user is detected. Moreover, the image processing device 100 identifiably displays the detection frames as the marks indicating the result of detecting persons on the basis of the reference conditions, and the candidate frames as the marks indicating the result of detecting persons on the basis of the other detection conditions. Therefore, by simple operation of selecting, from among the displayed candidate frames, a candidate frame corresponding to a person who is desired to be added, the user is capable of adding an undetected person to the detection result. Further, by specifying only one detection object that is desired to be included in the detection result, the user is capable of displaying a plurality of detection objects (the detection result) detected under such detection conditions that this detection object is detected. In this manner, the image processing device 100 according to the present embodiment is capable of supporting the adjustment of the number of detected objects.

A first modification example of the image processing device 100 according to the present embodiment will be described. The image processing device 100 may be configured in such a manner that when a correction instruction is accepted, detection conditions are changed from reference conditions to other detection conditions without accepting a specification of a person who is desired to be included as the detection result, persons are then detected on the basis of the detection conditions after the change, and candidate frames corresponding to the detection result are additionally displayed.

In addition, as a second modification example, the image processing device 100 may be configured in such a manner that detection conditions, the parameter of which is an inclination of a body-height direction of a person with respect to a predetermined direction of an image as an alternative to the upper-body size of the person, are used as reference conditions. Here, it is assumed that the predetermined direction is the vertical direction of the image.

Figure 12:
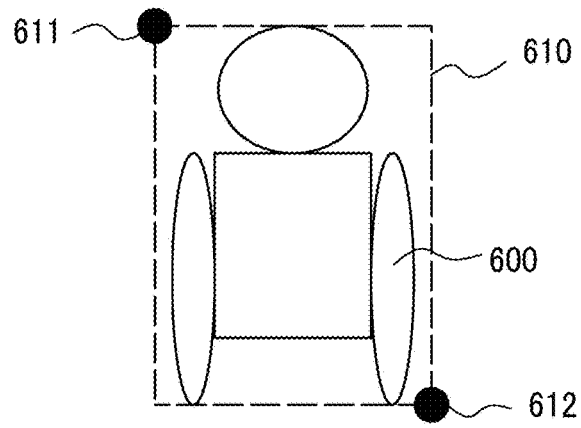
FIG. 12 is an explanatory drawing illustrating user operation of specifying a rectangular area according to the second embodiment.

Moreover, in the present modification example, the image processing device 100 may be configured to accept a specification of a rectangular detection frame from the user, and then to estimate an inclination of the body-height direction according to a shape of the detection frame. Estimation processing of estimating an inclination of the body-height direction will be described below. As shown in FIG. 12, the user is capable of specifying an undetected person 600 by dragging an area of the upper body of the undetected person 600 in the result screen 500a. For example, the user is capable of specifying a rectangular area 610 by the operation of moving a mouse down at a point 611, and moving the mouse up at a point 612.

Figure 13:
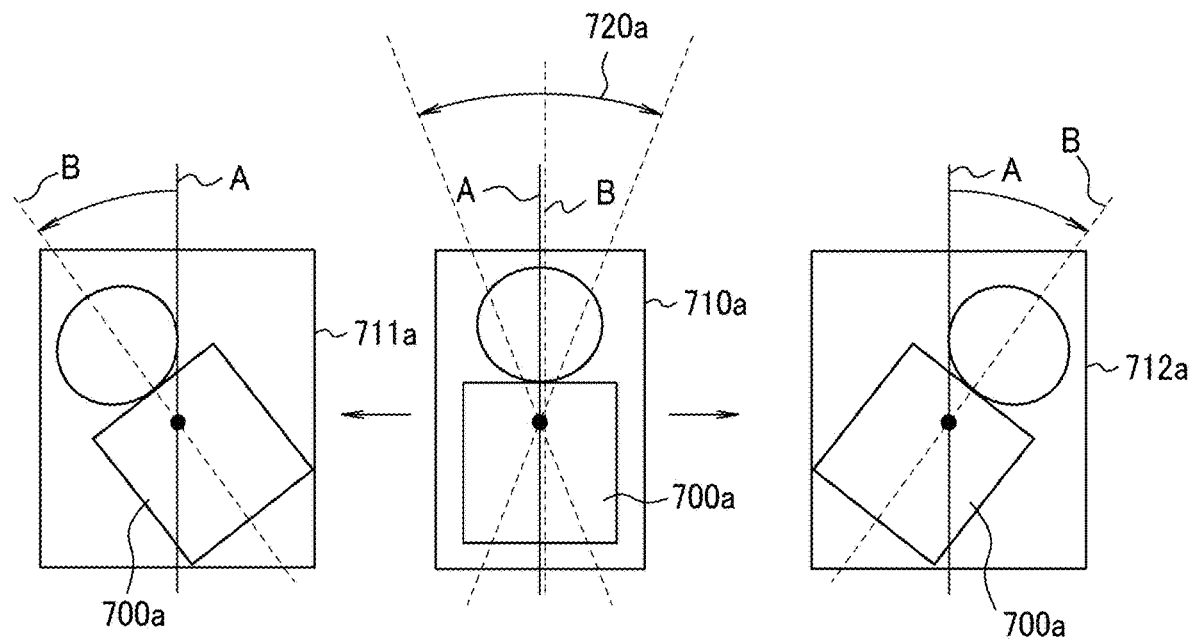
FIG. 13 is an explanatory drawing illustrating the relationship between a rectangular shape and an inclination of a body-height direction according to the second embodiment.

FIG. 13 is an explanatory drawing illustrating the relationship between a rectangular shape and an inclination of a body-height direction. A rectangular area 710a is specified when a body-height direction B of an undetected person 700a agrees with a vertical direction A of a target image. Meanwhile, it is assumed that the person 700a has been imaged in a state in which the person 700a inclines to the left in the target image because of, for example, bending forward. In this case, as shown in the left part of FIG. 13, a ratio of the horizontal side to the vertical side for a rectangular area 711a that is circumscribed about the person 700a becomes larger than that for the rectangular area 710a.

In addition, when a person is imaged in a state in which the person inclines to the right in the target image, as shown in the right of FIG. 13, as with the rectangular area 711a, a ratio of the horizontal side to the vertical side for a rectangular area 712a that is circumscribed about the person 700a becomes larger than that for the rectangular area 710a. In this manner, the inclination of the body-height direction and the horizontal to vertical ratio of the rectangular area correlate with each other. The acceptance unit 201 uses this correlation to estimate the inclination of the body-height direction from the horizontal to vertical ratio of the rectangular area of the undetected person specified by the user, and accepts a specifying instruction to specify an allowable range of the inclination including the estimated inclination. Subsequently, the detection unit 203 changes a parameter value in such a manner that a person, the inclination of which falls within the allowable range related to the specifying instruction, is detected. As indicated with 720a, the detection unit 203 changes the parameter value to such a value that the allowable range of the inclination of the body-height direction with respect to the vertical direction of the image extends in both the plus and minus directions.

In addition, as a third modification example, other detection conditions have only to differ from reference conditions, and therefore the interrelationship therebetween is not limited to those in the embodiments. For example, when detection conditions are changed, instead of changing a parameter value, the detection unit 203 may change from one parameter set as reference conditions to other detection conditions that include other kinds of parameters. More specifically, for example, the detection unit 203 may change from reference conditions that include a first parameter for detecting a shape of an upper body to other detection conditions that include a second parameter for detecting a person's face.

In addition, as another example, while conditions that include a parameter of the upper-body size of a person are used as reference conditions, conditions that include not only the parameter of the upper-body size but also a parameter of the inclination of the body-height direction of a person with respect to the vertical direction of the image may be used as other detection conditions. Thus, the number of parameters may differ between the reference conditions and the other detection conditions.

Moreover, as still another example, in a case where a person riding on a bicycle is a detection object, while the detection of both the person and the bicycle is used as reference conditions, the detection of only the person may be used as other detection conditions. As the result, for example, such a person that although the person comes out in an image, a bicycle on which the person is riding goes out from an imaging range can also be detected as a person who is riding on a bicycle.

Furthermore, as a further example, in a case where an automobile is a detection object, while reference conditions include both a parameter of a shape of an automobile and a parameter of a shape of a number plate, conditions that exclude the number plate from detection objects and include only the shape of the automobile as a parameter may be used as other detection conditions. This enables to obtain more automobiles as the detection result under the other detection conditions.

As described above, according to the abovementioned embodiment, the number of detected detection objects can be easily adjusted.

As described above, although preferred embodiments have been explained in detail, the present application is not intended to be limited to the specific embodiments presented, and various modifications or changes may be made therein without departing from the scope of the application.

Other Examples

Various embodiments can also be realized even by processing in which a program for realizing one or more functions of the above-described embodiments is supplied to a system or a device through a network or a storage medium, and one or more processors of a computer of the system or the device reads and executes the program. In addition, various embodiments can also be realized by a circuit (for example, ASIC) for realizing one or more functions.

According to the embodiments described above, the number of detected detection objects can be easily corrected.

Other Embodiments

Embodiment(s) of the present application can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the scope of the following claims is to be accorded the broadest interpretation so as to encompass all such modifications and equivalent structures and functions.

What is claimed is:

1. An image processing device comprising:
    an obtaining unit configured to obtain image data; and
    a control unit configured to cause a display unit to display an image, based on the image data, on which one or more first marks each indicating an object detected in the image are superimposed and to display a numeral corresponding to a number of the one or more first marks superimposed on the image,
        wherein, if information about a user operation for adding one or more second marks to be superimposed on the image displayed by the display unit is obtained, the control unit causes the display unit to display an updated numeral corresponding to a total number of the number of the one or more first marks superimposed on the image and a number of the one or more second marks added according to the user operation and superimposed on the image.

2. The image processing device according to claim 1, wherein the control unit causes the display unit to display the image on which each of the one or more first marks is superimposed at a position corresponding to the object detected in the image.

3. The image processing device according to claim 1, wherein if the information about the user operation for adding the one or more second mark is obtained, the control unit causes the display unit to display the image on which the one or more first marks each indicating the object detected in the image and the one or more second marks added according to the user operation are superimposed.

4. The image processing device according to claim 3, wherein each of the one or more second marks has a predetermined size.

5. The image processing device according to claim 3, further comprising
    a determination unit configured to determine, if the information about the user operation in which a position in the image is specified for adding the second mark is obtained, a size of the first mark located at a position closest to the specified position to be the size of the second mark,
    wherein the control unit causes the display unit to display the image on which the one or more first marks each indicating the object detected in the image and the second mark based on the user operation are superimposed, the second mark having the size determined by the determination unit.

6. The image processing device according to claim 3, further comprising
    a determination unit configured to determine, if the information of the user operation in which a position in the image is specified for adding the second mark is obtained, a size of the second mark on the basis of a size of the first mark existing within a reference range with reference to the specified position, wherein the control unit causes the display unit to display the image on which the one or more fist marks each indicating the object detected in the image and the second mark based on the user operation are superimposed, the second mark having the size determined by the determination unit.

7. The image processing device according to claim 3, wherein if the information about the user operation in which a position in the image is specified for adding the second mark is obtained, the control unit causes the display unit to display the image on which the one or more first marks each indicating the object detected in the image and the second mark based on the user operation are superimposed, the second mark being superimposed at a position corresponding to the specified position.

8. The image processing device according to claim 1, wherein if information about a user operation for deleting at least one of the one or more first marks and the one or more second marks superimposed on the image displayed by the display unit is obtained, the control unit causes the display unit to display an updated numeral corresponding to a number of the one or more first marks and the one or more second marks excluding the at least one deleted according to the user operation.

9. The image processing device according to claim 8, wherein if the information about the user operation in which the first mark or the second mark superimposed on the image is specified for deleting the first mark or the second mark is obtained, the control unit causes the display unit to display the image on which the specified first mark or the specified second mark is not superimposed.

10. An image processing device comprising:
    an obtaining unit configured to obtain image data; and
    a control unit configured to cause a display unit to display an image, based on the image data, on which one or more first marks each indicating an object detected in the image are superimposed and to display a numeral corresponding to a number of the one or more first marks superimposed on the image,
        wherein, if information about a user operation for deleting at least one of the one or more first marks superimposed on the image displayed by the display unit is obtained, the control unit causes the display unit to display an updated numeral corresponding to a number of the one or more first marks excluding the at least one deleted according to the user operation.

11. The image processing device according to claim 10, wherein the control unit causes the display unit to display the image on which each of the one or more first marks is superimposed at a position corresponding to the object detected in the image.

12. The image processing device according to claim 10, wherein if the information about the user operation in which the first mark superimposed on the image is specified for deleting the first mark is obtained, the control unit causes the display unit to display the image on which the specified first mark is not superimposed.

13. An image processing method comprising:
obtaining image data; and
causing a display unit to display an image, based on the image data, on which one or more first marks each indicating an object detected in the image are superimposed and to display a numeral corresponding to a number of the one or more first marks superimposed on the image,
wherein, if information about a user operation for adding one or more second marks to be superimposed on the image displayed by the display unit is obtained, the causing causes the display unit to display an updated numeral corresponding to a total number of the number of the one or more first marks superimposed on the image and a number of the one or more second marks added according to the user operation and superimposed on the image.

14. The image processing method according to claim 13, wherein the causing causes the display unit to display the image on which each of the one or more first marks is superimposed at a position corresponding to the object detected in the image.

15. The image processing method according to claim 13, wherein if the information about the user operation for adding the second mark is obtained, the causing causes the display unit to display the image on which the one or more first marks each indicating the object detected in the image and the second mark based on the user operation are superimposed.

16. The image processing method according to claim 15, wherein the second mark has a predetermined size.

17. The image processing method according to claim 15, further comprising
determining, if the information about the user operation in which a position in the image is specified for adding the second mark is obtained, a size of the first mark located at a position closest to the specified position to be the size of the second mark,
wherein the causing causes the display unit to display the image on which the one or more first marks each indicating the object detected in the image and the second mark based on the user operation are superimpose, the second mark having the size determined in the determining.

18. The image processing method according to claim 15, further comprising
determining, if the information of the user operation in which a position in the image is specified for adding the second mark is obtained, a size of the second mark on the basis of a size of the first mark existing within a reference range with reference to the specified position,
wherein the causing causes the display unit to display the image on which the one or more first marks each indicating the object detected in the image and the second mark based on the user operation are superimposed, the second mark having the size determined in the determining.

19. The image processing method according to claim 15, wherein if the information about the user operation in which a position in the image is specified for adding the second mark is obtained, the causing causes the display unit to display the image on which the one or more first marks each indicating the object detected in the image and the second mark based on the user operation are superimpose, the second mark being superimposed at a position corresponding to the specified position.

20. The image processing method according to claim 13, wherein if information about a user operation for deleting at least one of the one or more first marks and the one or more second marks superimposed on the image displayed by the display unit is obtained, the causing causes the display unit to display an updated numeral corresponding to a number of the one or more first marks and the one or more second marks excluding the at least one deleted according to the user operation.

21. The image processing method according to claim 20, wherein if the information about the user operation in which the first mark or the second mark superimposed on the image is specified for deleting the first mark or the second mark is obtained, the causing causes the display unit to display the image on which the specified first mark or the specified second mark is not superimposed.

22. An image processing method comprising:
obtaining image data; and
causing a display unit to display an image, based on the image data, on which one or more first marks each indicating an object detected in the image are superimposed and to display a numeral corresponding to a number of the one or more first marks superimposed on the image,
wherein, if information about a user operation for deleting at least one of the one or more first marks superimposed on the image displayed by the display unit is obtained, the causing causes the display unit to display an updated numeral corresponding to a number of the one or more first marks excluding the at least one deleted according to the user operation.

23. The image processing method according to claim 22, wherein the causing causes the display unit to display the image on which each of the one or more first marks is superimposed at a position corresponding to the object detected in the image.

24. The image processing method according to claim 22, wherein if the information about the user operation in which the first mark superimposed on the image is specified for deleting the first mark is obtained, the causing causes the display unit to display the image on which the specified first mark is not superimposed.

25. A non-transitory computer readable storage medium that stores instructions that can be read by a computer, the instructions, when executed, causing the computer to perform a process comprising:
obtaining image data; and
causing a display unit to display an image, based on the image data, on which one or more first marks each indicating an object detected in the image are superimposed and to display a numeral corresponding to a number of the one or more first marks superimposed on the image, wherein, if information about a user operation for adding one or more second marks to be superimposed on the image displayed by the display unit is obtained, the causing causes the display unit to display an updated numeral corresponding to a total number of the number of the one or more first marks superimposed on the image and a number of the one or more second marks added according to the user operation and superimposed on the image.

26. A non-transitory computer readable storage medium that stores instructions that can be read by a computer, the instructions, when executed, causing the computer to perform a process comprising:

obtaining image data; and causing a display unit to display an image, based on the image data, on which one or more first marks each indicating an object detected in the image are superimposed and to display a numeral corresponding to a number of the one or more first marks superimposed on the image, wherein, if information about a user operation for deleting at least one of the one or more first marks superimposed on the image displayed by the display unit is obtained, the causing causes the display unit to display an updated numeral corresponding to a number of the one or more first marks excluding the at least one deleted according to the user operation.

* * * * *